US006613186B2

United States Patent
Johnson

(10) Patent No.: US 6,613,186 B2
(45) Date of Patent: Sep. 2, 2003

(54) AEROSOL SOLVENT CEMENT COMPOSITION

(75) Inventor: James J. Johnson, Cuyahoga Falls, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/917,046

(22) Filed: Jul. 27, 2001

(65) Prior Publication Data

US 2002/0043334 A1 Apr. 18, 2002

Related U.S. Application Data

(60) Provisional application No. 60/221,418, filed on Jul. 28, 2000.

(51) Int. Cl.[7] ............................. B32B 31/00; C09J 1/00
(52) U.S. Cl. ........................ 156/333; 524/95; 524/111; 524/113; 156/331.6
(58) Field of Search ................................. 524/113, 111, 524/95; 516/18; 156/333, 331.6

(56) References Cited

U.S. PATENT DOCUMENTS

| | | | |
|---|---|---|---|
| 3,726,826 A | | 4/1973 | Knight |
| 3,765,983 A | | 10/1973 | Putzier |
| 4,098,719 A | | 7/1978 | Hushebeck |
| 4,572,406 A | | 2/1986 | Pratt et al. |
| 4,788,002 A | | 11/1988 | King, Sr. |
| 4,910,244 A | * | 3/1990 | Dierdorf et al. ............ 524/179 |
| 5,037,867 A | * | 8/1991 | Ravichandran et al. ....... 524/95 |
| 5,264,148 A | | 11/1993 | Chou et al. |
| 5,340,871 A | | 8/1994 | Pearson et al. |
| 5,340,971 A | | 8/1994 | Rockstein et al. |
| 5,384,345 A | | 1/1995 | Naton |
| 5,416,142 A | * | 5/1995 | Bush et al. ................. 524/113 |
| 5,470,894 A | | 11/1995 | Patel et al. |
| 5,480,925 A | * | 1/1996 | Masuzaki et al. ........... 252/305 |
| 5,859,103 A | | 1/1999 | Congelio et al. |
| 5,962,560 A | | 10/1999 | Congelio et al. |
| 5,988,455 A | | 11/1999 | Pearson et al. |
| 6,087,421 A | | 7/2000 | Patel et al. |
| 6,429,242 B1 | | 8/2002 | Macher et al. |
| 2001/0047848 A1 | | 12/2001 | Green |

FOREIGN PATENT DOCUMENTS

| | | |
|---|---|---|
| DE | 2250218 | 4/1974 |
| EP | 0814139 A1 | 12/1997 |

OTHER PUBLICATIONS

ASTM Designation Nos. D 3138–93, Standard Specification for Solvent Cements for Transition Joints Between Acrylonitrile–Butadiene–Styrene (ABS) and Poly(Vinyl Chloride) (PVC) Non–Pressure Piping Components 1, pp. 399–401; D 2564–93, Standard Specification for Solvent Cements for Poly(Vinyl Chloride) (PVC) Plastic Piping Systems 1, pp. 211–214; F 656–96a, Standard Specification for Primers for Use in Solvent Cement Joints of Poly(Vinyl Chloride) (PVC) Plastic Pipe and Fittings 1, pp. 1–3.

D 2235–93a, Standard Specification for Solvent Cement for Acrylonitrile–Butadiene–Styrene (ABS) Plastic Pipe and Fittings 1, pp. 84–88; and D 2846–93, Standard Specification for Chlorinated Poly(Vinyl Chloride) (CPVC) Plastic Hot–and Cold–Water Distribution Systems 1, pp. 316 and 317.

(List continued on next page.)

*Primary Examiner*—Jeff H Aftergut
(74) *Attorney, Agent, or Firm*—Robert E. McDonald; Paul R. Katterle; Vivien Y. Tsang

(57) ABSTRACT

A pressurized aerosol solvent cement product and a method of using the same is disclosed. The aerosol solvent cement product includes an aerosol solvent cement composition disposed in a container. The aerosol solvent cement composition includes tetrahydrofuran, a thermoplastic resin soluble in tetrahydrofuran, a propellant, and a stabilizing composition.

14 Claims, 1 Drawing Sheet

OTHER PUBLICATIONS

OMG Americas, Inc., Materials Safety Data Sheet, date revised: Apr. 27, 1999, pp. 1–5.

Cabot Corporation, Material Safety Data Sheet, date revised: Jul. 1997. pp. 1–6.

DuPont, Material Safety Data Sheet, printed Aug. 20, 1966, pp. 1–8.

BF Goodrich, TempRite CPVC Resin—Molding Grades, 1 pg., and Material Safety Data Sheet, Effective Date: May 19, 1999, pp. 1–10.

Industrial Copolymers Limited, Safety Data Sheet, Revised Jul. 1996, pp. 1–4.

Hukill Chemical Lab No. 31338, dated Mar. 15, 1972; Lab No. 31339 dated Mar. 28, 1972 and Mar. 15, 1972; Lab No. 30333 dated Jun. 16, 1971 and Jun. 16, 1971; and Sprayon Products, Inc. Product Specification Sheet dated Sep. 22, 1970.

Hukill Chemical Lab No. 27290, dated Sep. 9, 1969 and Aug. 13, 1969; memo dated Jun. 23, 1969; and Sprayon Products, Inc. memo dated Aug. 13, 1969.

Hukill Chemical Lab No. 27291, dated Aug. 13, 1969.

Hukill Chemical Lab No. 27292, dated Aug. 15, 1969 and Aug. 13, 1969.

Carlon Lab. No. 34893, dated Apr. 2, 1975; Sprayon Products, Inc. memo from Joe Marchbank not dated; Carlon Lab. No. 34893, dated Feb. 28, 1975, Feb. 20, 1975, and Nov. 22, 1974; memos dated Apr. 22, 1975, Mar. 19, 1975, and Feb. 10, 1975; Sprayon Products, Inc. memo dated Feb. 5, 1975; Sprayon Products, Inc. memo from Gene Bishop not dated; Sprayon Products, Inc. memos dated Nov. 8, 1974 and Jul. 17, 1975; 1 page worksheet beginning with date of Feb. 4, 1975; a Solids Determinations sheet dated Mar. 17, 1975; and a Non–Volatile Determination sheet dated Feb. 28, 1975 Carlon Lab No. 34362, dated Jun. 27, 1974; and Sprayon Products, Inc. memos dated Jun. 27, 1974, Oct. 22, 1974, and Nov. 11, 1974 Thermoplastic Corp. Lab No. 24679, dated Nov. 22, 1967, and letter to Sprayon Products, Inc. dated Nov. 16, 1967 Anesite Lab No. 24507, dated Oct. 18, 1967; and letter to Sprayon Products, Inc. dated Oct. 13, 1967.

Oatey Mfg. Co. Lab No. 28712, dated Aug. 6, 1970 and Jun. 16, 1970; along with Sprayon Products, Inc. memos dated Jun. 1, 1970 and Jul. 2, 1964.

U–Brand Corporation Lab No. 33371, dated Aug. 7, 1973 and No. 33370 dated Aug. 7, 1973.

Carlon Lab No. 32411, dated Jun. 1, 1973, May 1, 1973, and Dec. 12, 1972; along with Sprayon Products, Inc. memo dated Dec. 11, 1972; memo dated Mar. 1, 1973; Sprayon Products, Inc. Memo from Joe Marchbank not dated; memo dated Mar. 1, 1973, Carlon Shipping Order dated Apr. 19, 1973; and Sprayon Products, Inc. memo dated Feb. 7, 1974.

Industrial Copolymers Limited, "Oxazolidines", Dec. 2, 1999, 2 pages.

* cited by examiner

US 6,613,186 B2

AEROSOL SOLVENT CEMENT COMPOSITION

CROSS-REFERENCE TO RELATED APPLICATION

This application claims the benefit of U.S. Provisional Application No. 60/221418, filed Jul. 28, 2000.

BACKGROUND OF THE INVENTION

This invention relates to solvent cements in general and, more particularly, to solvent cements that can be dispensed in an aersosol spray from a sealed and pressurized container.

Solvent cements are used extensively to join conduits, pipes, fittings and other articles composed of thermoplastic material. The most commonly used thermoplastic materials for forming pipes etc. are polyvinyl chloride (PVC), chlorinated polyvinyl chloride (CPVC), and acrylonitrilebutadiene-styrene (ABS). Generally, solvent cement comprises a mixture of solvents and resin. The solvents dissolve the surface layers of the articles being joined such that when the objects are pressed together, the surface layers flow together. Upon evaporation of the solvents, a bond or weld is formed between the two articles. The resin fills any voids that may form between the articles. Often a primer is used before the solvent cement is applied to the articles. Usually, the primer is a blend of the same solvents that are present in the solvent cement.

Recommended practices for forming solvent welds are set forth in ASTM D-2855 for PVC to PVC welds, and in ASTM D-3138 for PVC to ABS welds. PVC and CPVC resin requirements are set forth in ASTM D-1784. Solvent cements are covered in ASTM 2564 for PVC, and in ASTM D-3138 for PVC to ABS. All these ASTM references are incorporated herein by reference and made a part hereof.

Conventionally, the solvent cement is stored in a container having a closable opening and is applied to the articles by a brush or rag. This method of application is messy and requires cleaning of the brush or rag. Moreover, the composition of the solvent cement often changes with repeated use due to the evaporation of the solvents from the container. In order to address the foregoing drawbacks of the conventional storage and application of solvent cement, it has been proposed to dispense solvent cement in an aerosol spray from a sealed and pressurized container. Conventional solvent cement compositions, however, tend to become unstable when stored and dispensed in this manner.

Based upon the foregoing, there is a need in the art for a solvent cement composition that can be dispensed in an aersosol spray from a sealed and pressurized container, without loss of stability. The present invention is directed to such an aerosol solvent cement composition.

SUMMARY OF THE INVENTION

In accordance with the present invention, a pressurized aerosol solvent cement product is provided having a container that includes a can, a valve cup with a valve assembly, a dip tube and an actuator. The can is comprised of tin-plated steel. An aerosol solvent cement composition is disposed within the container. The aerosol solvent cement composition includes at least 10 weight percent tetrahydrofuran, at least 10 weight percent acetone, a thermoplastic resin, a propellant selected from the group consisting of ethers, C1–C4 saturated hydrocarbons, hydrofluorocarbons, and mixtures of the foregoing, and a stabilizing composition effective to keep the solvent weld composition stable after the aerosol solvent cement product has been held at a temperature of 120° F. for 90 days.

In accordance with another embodiment of the present invention, a pressurized aerosol solvent cement product is provided having a container that includes a can, a valve cup with a valve assembly, a dip tube and an actuator. An aerosol solvent cement composition is disposed within the container. The aerosol solvent cement composition includes a solvent system comprising at least 10 weight percent tetrahydrofuran, a thermoplastic resin, a propellant selected from the group consisting of ethers, C1–C4 saturated hydrocarbons, hydrofluorocarbons, and mixtures of the foregoing, and a stabilizing composition comprising an oxazolidine compound.

Also provided in accordance with the present invention is a method of joining two objects composed of thermoplastic. In accordance with the method, a pressurized aerosol solvent cement product is provided. The aerosol solvent cement product has a container including a can, a valve cup with a valve assembly, a dip tube and an actuator. The can is comprised of tin-plated steel. An aerosol solvent cement composition is disposed within the container. The aerosol solvent cement composition includes at least 10 weight percent tetrahydrofuran, at least 10 weight percent acetone, a thermoplastic resin, a propellant selected from the group consisting of ethers, C1–C4 saturated hydrocarbons, hydrofluorocarbons, and mixtures of the foregoing, and a stabilizing composition effective to keep the aerosol solvent cement composition stable after the aerosol solvent cement product has been held at a temperature of 120° F. for 90 days. The actuator of the container is manipulated to cause a spray of the aerosol solvent cement composition to be ejected from the container. The spray is directed to deposit films of the aerosol solvent cement on portions of the objects to be joined. The objects are then moved to bring the portions with the aerosol solvent cement deposited thereon into contact with each other.

BRIEF DESCRIPTION OF THE DRAWING

The features, aspects, and advantages of the present invention will become better understood with regard to the following description, appended claims, and accompanying drawing where:

DETAILED DESCRIPTION OF THE PREFERRED EMBODIMENTS

Figure 1:
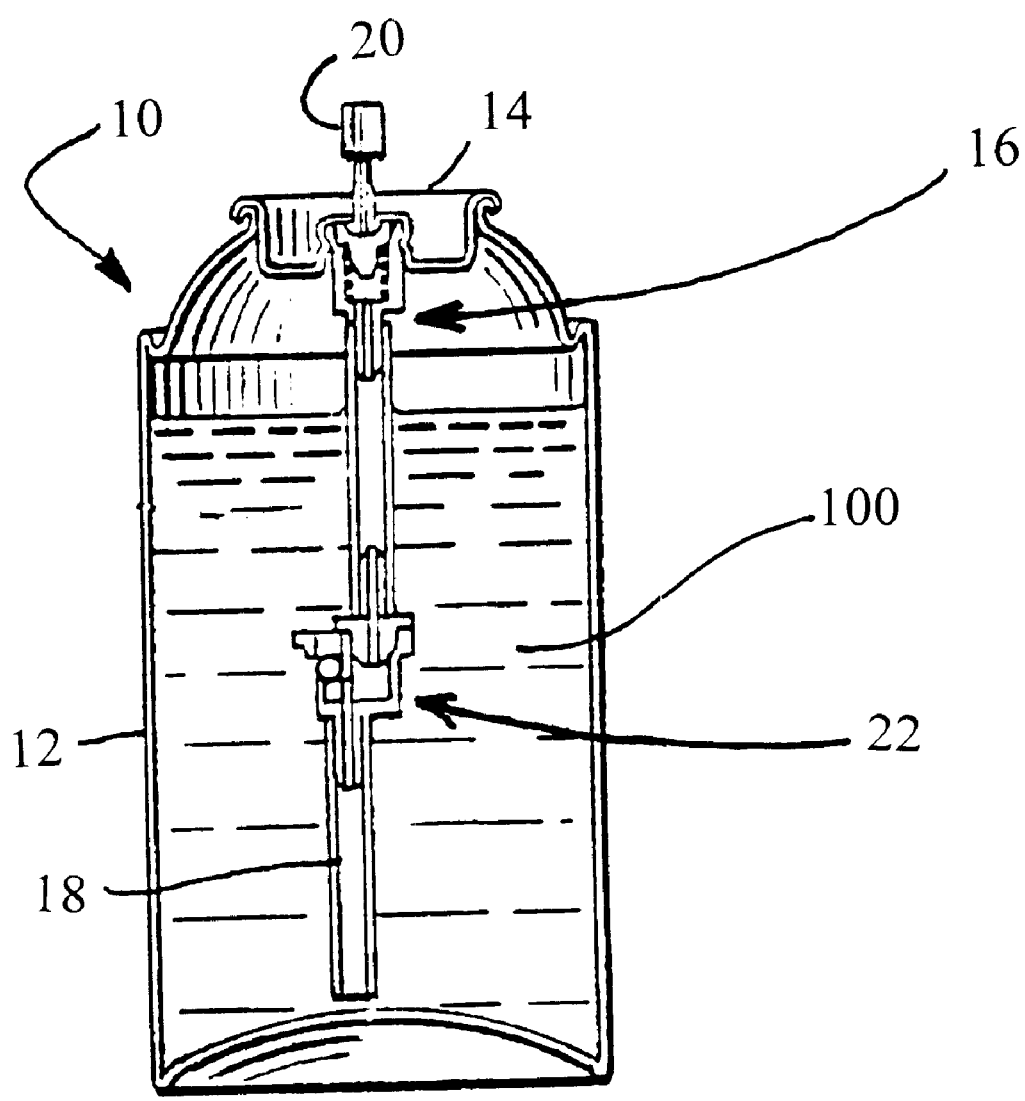
FIG. 1 shows a sectional view of an aerosol container containing an aerosol solvent cement composition.

As used herein, the term "volatile organic solvent" shall mean an organic solvent capable of vaporizing at atmospheric pressure and a temperature in a range from about 35° F. to about 140° F.

The aerosol solvent cement composition of the present invention preferably comprises the following main components:

(a) a solvent system;
(b) a thermoplastic resin;
(c) an oxazolidine compound;
(d) an organotin compound;
(e) a carbonate compound; and
(f) a propellant Preferably, the aerosol solvent cement composition of the present invention also comprises the following additional components:

(g) inorganic filler;
(h) an antioxidant compound;
(i) a hygroscopic compound; and
(j) a colorant The solvent system comprises at least one volatile organic solvent, more preferably a mixture of at least two volatile organic solvents. The solvent system dissolves the surface layers of the pieces being joined so that they flow together when the pieces are pressed together, thereby effecting a bond upon evaporation of the solvent system. Volatile organic solvents that may be used in the solvent system include lower alcohols, such as methanol, ethanol and isopropanol; ketones, such as acetone, methyl ethyl ketone (MEK), methyl propyl ketone, methyl isobutyl ketone, isophorone and cyclohexanone; esters, such as methyl acetate, ethyl acetate, ethyl formate, ethyl propionate, and butyl acetate; dibasic esters (DBE), such as dimethyl adipate, dimethyl glutarate, and dimethyl succinate; halogenated solvents, such as methylene chloride, ethylene dichloride, trichloroethylene; ethers, such as dioxane and bis-β-methoxyethyl ether; cyclic ethers, such as tetrahydrofuran (THF); lactams, such as N-phenyl-2-pyrrolidone, 2-piperidone, 2-pyrrolidone, N-ethyl-2-pyrrolidone, N-methyl-2-pyrrolidone; and other volatile organic solvents, such as gamma-butyrolactone, and dimethylformamide. Mixtures of the foregoing solvents may also be used and are in fact preferred. Preferably, the solvent system comprises THF and at least one of MEK and cyclohexanone. More preferably, the solvent system comprises THF, acetone and at least one of MEK and cyclohexanone. The aerosol solvent cement composition preferably comprises at least 10 weight percent acetone and at least 10 weight percent THF.

In one preferred embodiment of the present invention, the solvent system comprises a mixture of THF, MEK, acetone, and DBE, wherein the aerosol solvent cement composition comprises: about 10 to about 50 weight percent, more preferably about 20 to about 40 weight percent, more preferably about 30 to about 40 weight percent, still more preferably about 35 weight percent THF; about 0.5 to about 25 weight percent, more preferably about 1 to about 15 weight percent, more preferably about 5 to about 12 weight percent, still more preferably about 9 weight percent MEK; about 5 to about 30 weight percent, more preferably about 10 to about 25 weight percent, more preferably about 15 to about 25 weight percent, still more preferably about 21 weight percent acetone; and about 0.10 to about 5 weight percent, more preferably about 0.5 to about 3 weight percent, more preferably about 0.75 to about 1.25 weight percent, still more preferably about 1 weight percent DBE, preferably dimethyl succinate, such as is available from DuPont under the tradename DBE-4.

The amount of the solvent system present in the aerosol solvent cement composition is preferably from about 25 to about 75 weight percent, more preferably from about 40 to about 70 weight percent, more preferably from about 60 to about 70 weight percent, still more preferably about 66 weight percent of the total aerosol solvent cement composition.

The thermoplastic resin accelerates the setting of the two objects being joined, fills any voids that may form, and reduces stress. Examples of thermoplastic resins that may be used in the present invention include polyvinyl chloride (PVC), chlorinated polyvinyl chloride (CPVC), poly(acrylonitrile-butadiene-styrene) (ABS), polyvinylidene fluoride (PVDF), polystyrene, polycarbonate, polyacrylates, cellulose acetate, polyacrylamide, polyamide, mixtures of the foregoing, and any other thermoplastic resin that is soluble in a volatile solvent. Preferably, the thermoplastic resin used in the aerosol solvent cement composition of the present invention is selected from the group consisting of PVC, CPVC, ABS, and mixtures thereof. More preferably, the thermoplastic resin is CPVC. Still more preferably, the thermoplastic resin is CPVC having an inherent viscosity in a range from about 0.6 to about 0.96 and a chlorination level in a range from about 58 to about 72 weight percent. An example of such CPVC is TempRite 674X571 available from The B.F. Goodrich Company.

The amount of the thermoplastic resin present in the aerosol solvent cement composition is preferably from about 10 to about 30 weight percent, more preferably from about 10 to about 20 weight percent, more preferably from about 10 to about 15 weight percent, still more preferably about 10 weight percent of the total aerosol solvent cement composition.

The aerosol solvent cement composition of the present invention is stabilized by a synergistic combination of the oxazolidine compound, the organotin compound, and the carbonate compound.

Preferably, the oxazolidine compound comprises at least one monocyclic oxazolidine containing the group:

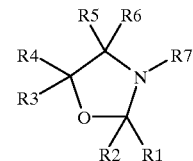

wherein: R1 is a methyl group, or a branched or straight chain alkyl or alkanol group; R2, R3, R4, and R6 are individually, a hydrogen atom, a methyl group, a straight chain or branched alkyl chain or alkanol group, a cyclic alkyl, or an aryl group; R5 is a methyl or methylol group, or a branched chain or straight chain alkyl or alkanol group; and R7 is a hydrogen atom, a straight chain or branched chain alkyl or alkanol group, a cyclic alkyl group, a carbonyl group, or an aryl group. Examples of monocyclic oxazolidines that may be used in the oxazolidine compound include 2,3-dimethyl oxazolidine; 3-ethyl-2-octyl oxazolidine; 2,3-di-isopropyl oxazoline; 2-isobutyl-3-ethyl-2-methyl oxazolidine; 3-n-butyl-2-(3-heptyl) oxazolidine; 3-decyl-2,2,4,4-tetramethyl oxazolidine; 2,3,4,4,-tetramethyl oxazolidine; and 2-isopropyl-4-ethyl oxazolidine. Preferably, the oxazolidine compound comprises a moncyclic oxazolidine commercially available from Industrial Copolymers Limited under the tradename Incozol 2 (CAS No.165101-57-5). Incozol 2 comprises 3-n-butyl-2-(3-heptyl)oxazolidine.

The amount of the oxazolidine compound present in the aerosol solvent cement composition is preferably from about 0.025 to about 5 weight percent, more preferably from about 0.05 to about 1 weight percent, more preferably from about 0.08 to about 0.2 weight percent, still more preferably about 0.1 weight percent of the total aerosol solvent cement composition.

Preferably, the organotin compound comprises at least one diaryl or dialkyl tin-IV compound. More preferably, the organotin compound is selected from the group consisting of: dialkyl tin dithioesters, such as dioctyl tin dithioglycolate, and dibutyl tin dithioglycolate; dialkyl tin dimercaptides, such as dioctyl tin dimercaptide, dimethyl tin bis-(butylmercaptide), dibutyl tin-bis-(octylmercaptide), and dioctyl tin-bis-(laurylmercaptide); and dialkyl tin esters of carboxylic acids, such as dibutyl tin carboxylate, dibutyl tin diacetate, dibutyl tin dilaurate, dibutyl tin distearate, dimethyl tin distearate, dimethyl tin maleate, dibutyl tin maleate, dioctyl tin diacetate, and di-n-octyl tin maleate; and mixtures of the foregoing. Still more preferably, the organotin compound comprises dibutyl tin dilaurate.

The amount of the organotin compound present in the aerosol solvent cement composition is preferably from about 0.05 to about 5 weight percent, more preferably from about 0.1 to about 2 weight percent, more preferably from about 0.1 to about 0.5 weight percent, still more preferably about 0.2 weight percent of the total aerosol solvent cement composition.

Preferably, the carbonate compound comprises at least one ammonium or metal carbonate. Examples of suitable metal carbonates include potassium carbonate, sodium carbonate, calcium carbonate, lithium carbonate, strontium carbonate, barium carbonate, aluminum carbonate, zinc carbonate, or cadmium carbonate. More preferably, the carbonate compound is selected from the group consisting of: ammonium carbonate, sodium carbonate, calcium carbonate, potassium carbonate, lithium carbonate and mixtures of the foregoing. Still more preferably, the carbonate compound comprises calcium carbonate.

The amount of the carbonate compound present in the aerosol solvent cement composition is preferably from about 0.25 to about 5 weight percent, more preferably from about 1 to about 5 weight percent, more preferably from about 3 to about 5 weight percent, still more preferably about 4 weight percent of the total aerosol solvent cement composition.

The propellant is a liquafiable gas having a vapor pressure sufficient to propel the aerosol solvent cement composition from the container. Preferably, the propellant is selected from the group consisting of ethers, such as dimethyl ether (DME) and diethyl ether; C1–C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing. More preferably, the propellant is dimethyl ether.

The amount of the propellant present in the aerosol solvent cement composition is preferably from about 10 to about 50 weight percent, more preferably from about 10 to about 30 weight percent, more preferably from about 15 to about 25 weight percent, still more preferably about 18 weight percent of the total aerosol solvent cement composition.

In addition to the above main components, the aerosol solvent cement composition of the present invention may and preferably does contain inorganic filler, an antioxidant compound, a hygroscopic compound, and a colorant.

The inorganic filler is inert and improves the working viscosity and structural strength of the aerosol solvent cement composition. Preferably, the inorganic filler is a fine powder having an average particle size of less than about 50 microns and a density of less than about 4 g/cc. Suitable compounds that may be used as the inorganic filler include amorphous silica, silica flour, ground quartz, talc, magnesium silicate, calcium carbonate, clay, whiting, shell flour, wood flour, alumina, antimony trioxide, barium sulfate, calcined clays, China clays, magnesium oxide, mica powder, fumed silica, and mixtures of the foregoing. Preferably, the inorganic filler comprises fumed silica, such as a fumed silica commercially available from Cabot Corporation under the trade designation CAB-O-SIL.

If present, the amount of inorganic filler in the aerosol solvent cement composition is preferably from 0.1 to about 5 weight percent, more preferably from about 0.5 to about 4 weight percent, more preferably from about 1 to about 3 weight percent, still more preferably about 2 weight percent of the total aerosol solvent cement composition.

The antioxidant compound helps prevent degradation of the thermoplastic resin. The antioxidant compound preferably comprises tetrakis [methylene (3,5-di(tert)-butyl-4-hydroxyhydrocinnamate)] methane, which is commercially available from the Ciba-Geigy Corporation under the tradename Irgonox 1010. Less preferably, the antioxidant compound comprises butylated hydroxy toluene, an alkylated diphenolic, or another known antioxidant.

If present, the amount of the antioxidant compound in the aerosol solvent cement composition is preferably from 0.01 to about 5 weight percent, more preferably from about 0.05 to about 2 weight percent, more preferably from about 0.075 to about 0.5 weight percent, still more preferably about 0.1 weight percent of the total aerosol solvent cement composition.

The hygroscopic compound absorbs and locks up water in the aerosol solvent cement composition. Suitable hygroscopic agents that may be used in the hygroscopic compound include calcium oxide, silica dioxide, barium oxide, and potassium chloride. Preferably, the hygroscopic compound comprises silica dioxide, such as is commercially available from Grace Davison under the tradename Syloid AL-1.

If present, the amount of the hygroscopic compound in the aerosol solvent cement composition is preferably from 0.01 to about 5 weight percent, more preferably from about 0.05 to about 2 weight percent, more preferably from about 0.1 to about 0.5 weight percent, still more preferably about 0.3 weight percent of the total aerosol solvent cement composition.

The colorant is included in the aerosol solvent cement composition for aesthetic purposes and to also indicate the presence of a weld or bond formed by the aerosol solvent cement composition. Suitable colorants that may be used include titanium dioxide, carbon black, and solvent dyes. Preferably, the colorant is a liquid oil purple dye commercially available from Pylam Product Co., Inc. of Garden City, N.Y.

If present, the amount of colorant in the aerosol solvent cement composition is preferably from 0.01 to about 2 weight percent, more preferably from about 0.01 to about 1 weight percent, more preferably from about 0.01 to about 0.5 weight percent, still more preferably about 0.01 weight percent of the total aerosol solvent cement composition.

The aerosol solvent cement composition of the present invention may include other optional ingredients, such as wetting agents, adhesion promoters, and buffers. Preferably basic buffers are used, such as ammonia and amines. One especially preferred buffer is a 2 amino 2 methyl 1 propanol, 95% aqueous solution available from Ashland Chemical, Co., Dublin, Ohio under the tradename AMP 95.

The components (a)–(e) and additional components (g)–(j) described above form a solvent cement composition that when aerosolized with the propellant forms the aerosol solvent cement composition of the present invention.

Preferably, the solvent cement composition of the present invention is made in a batch process at or below a temperature of 70° F. The solvent system is charged one solvent at a time to a mixing vessel and blended for a short period of time to achieve a state of equilibrium. The thermoplastic resin is then charged to the mixing vessel and mixed with high shear dispensers to achieve complete dissolution in the solvent system. The oxazolidine compound, the organotin compound, and the carbonate compound are then added in stepwise fashion and thoroughly mixed therein. If the colorant, the antioxidant compound, and the hygroscopic compound are used, these components are added at this point as well. If the inorganic filler is used, the inorganic filler is added last and dispersed to achieve the desired flow characteristics. The resulting solvent cement composition is filtered through a 10 to 175 micron filter bag to remove any large agglomerations.

Referring now to FIG. 1, the solvent cement composition (shown by reference number 100) is charged to an aerosol container 10 comprising a can 12, to which a valve cup 14 is secured. A valve assembly 16 with a dip tube 18 connected thereto is secured to the valve cup 14. The dip tube 18 extends into the interior of the can 12 and is in contact with the solvent cement composition 100. The can 12 may be composed of aluminum or more preferably tin plated steel. The valve cup 14 may be sealed to the can 12 and the propellant charged through the valve assembly 16, or the can 12 may be charged with the propellant under the valve cup 14, and then the valve cup 14 sealed to the can 12. An actuator 20 is then connected to the valve assembly 16.

Various valves, dip tubes and actuators may be used to spray the aerosol solvent cement composition. Preferably, the dip tube 18 is a standard dip tube having a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061,203; 3,074,601; 3,209,960; and 5,027,985. Examples of "male" aerosol valves that may be used in the present invention are disclosed in U.S. Pat. Nos. 2,631,814, and 4,572,406. Preferably, the valve assembly 16 is a "female" valve with a spray controller 22 having a construction as disclosed in U.S. Pat. 4,572,406, which is hereby incorporated by reference. The spray controller 22 permits the aerosol solvent cement composition 100 to be dispensed when the container 10 is inverted.

The aerosol solvent cement composition of the present invention is useful in joining together pieces of CPVC, PVC, and ABS pipe in variety of applications, including, but not limited to, residential and commercial plumbing systems, sewer lines, sprinkler systems, and electrical conduits. The aerosol solvent cement composition of the present invention is used to join together pieces of CPVC, PVC, and ABS pipe in the same manner as conventional solvent weld cements, except the aerosol solvent cement composition is sprayed onto the pieces and not rubbed or brushed on. The aerosol solvent cement composition does not require the pieces being joined to be pre-treated with a primer like some conventional solvent weld cements. Consequently, the aerosol solvent cement composition of the present invention may be considered to be a one-step cement.

A method of using the aerosol solvent cement composition of the present invention will now be described. Two objects composed of CPVC, PVC, ABS, or combinations thereof are provided. The objects may be two pieces of pipe, or a pipe and a fitting, or two other types of objects. The objects are wiped clean with a dry cloth to remove any dirt, moisture, or foreign material. The aerosol container 10 containing the aerosol solvent cement composition is provided. The aerosol container 10 is shaken well and then properly positioned with regard to the objects. The actuator 20 of the aerosol container 10 is depressed to cause a spray of the aerosol solvent cement to be projected from the aerosol container 10. The aerosol container 10 is manipulated to direct the spray so as to form even films of the aerosol solvent cement on portions of the objects to be joined. The portions of the objects are then pressed together and held in this manner until a stable weld is formed between the two objects.

The invention will be better understood by reference to the following examples:

EXAMPLE 1

Batches of a solvent cement position were formed in a mixing vessel. Each batch was formed from the following components in the noted amounts, where parts are parts by weight.

| | |
|---|---|
| 30 | parts THF |
| 2 | parts DBE-4 |
| 6 | parts Cyclohexanone |
| 5 | parts MEK |
| 12 | parts Acetone |
| 1 | part CAB-O-SIL |
| 0.3 | parts Syloid AL-1 |
| 2 | parts Calcium Carbonate |
| 0.1 | parts Irgonox 1010 |
| 0.1 | parts Incozol 2 |
| 1 | part Dibutyl tin dilaurate |
| 10.4 | parts TempRite 674X571 |
| 0.1 | parts Pylam purple dye |

Each batch of solvent cement composition was then charged to an aerosol container composed of tin-plated steel and pressurized with 30 parts by weight DME to thereby yield a batch of an aerosol solvent cement composition. One aerosol container containing the aerosol solvent cement composition was subjected to freeze-thaw conditions and held at an elevated temperature of 120° F. for 90 days. The aerosol solvent cement composition remained stable, i.e., did not gel, and dispensed freely from the container. Another aerosol container containing the aerosol solvent cement composition was tested for shelf life by holding the aerosol container at ambient temperature (about 70° F.) for a period of more than 18 months. The aerosol solvent cement composition remained stable, i.e., did not gel, and dispensed freely from the aerosol container.

EXAMPLE 2

Batches of a solvent cement position were formed in a mixing vessel. Each batch was formed from the following components in the noted amounts, where parts are parts by weight.

| | |
|---|---|
| 34.79 | parts THF |
| 1.00 | part DBE-4 |
| 9.29 | parts MEK |
| 20.61 | parts Acetone |
| 2 | parts CAB-O-SIL |
| 4 | parts Calcium Carbonate |
| 0.1 | parts Incozol 2 |
| 0.2 | parts Dibutyl tin dilaurate |
| 10 | parts TempRite 674X571 |
| 0.01 | parts Pylam purple dye |

Each batch of solvent cement composition was then charged to an aerosol container composed of tin-plated steel and pressurized with 18 parts by weight DME to thereby yield a batch of an aerosol solvent cement composition. One aerosol container containing the aerosol solvent cement composition was subjected to freeze-thaw conditions and held at an elevated temperature of 120° F. for 90 days. The aerosol solvent cement composition remained stable, i.e., did not gel, and dispensed freely from the container.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of joining two objects composed of thermoplastic, said method comprising the steps of:
   (a.) providing a pressurized aerosol solvent cement product comprising:
      (i.) a container comprising a can, a valve cup with a valve assembly, a dip tube and an actuator, said can being comprised of tin-plated steel; and
      (ii) an aerosol solvent cement composition disposed within said container, said aerosol solvent cement composition comprising:
         at least 10 weight percent tetrahydrofuran;
         at least 10 weight percent acetone;
         a thermoplastic resin;
         a propellant selected from the group consisting of ethers, C1–C4 saturated hydrocarbons, hydrofluorocarbons, and mixtures of the foregoing; and a stabilizing composition effective to keep the aerosol solvent cement composition stable after the aerosol solvent cement product has been held at a temperature of 120° F. for 90 days, said stabilizing composition comprising an oxazolidine compound;
   (b.) manipulating the actuator of the container to cause a spray of the aerosol solvent cement composition to be ejected from the container;
   (c.) directing the spray to deposit films of the aerosol solvent cement on portions of the objects to be joined; and
   (d) moving the objects to bring the portions with the aerosol solvent cement deposited thereon into contact with each other.

2. The method of claim 1, wherein the propellant is dimethyl ether.

3. The method of claim 1, wherein the stabilizing composition further comprises an organotin compound and a carbonate compound.

4. The method of claim 3, wherein the oxazolidine compound comprises 3-n-butyl-2-(3-heptyl)oxazolidine, the organotin compound comprises dibutyl tin dilaurate, and the carbonate compound comprises calcium carbonate.

5. The method of claim 1, wherein the thermoplastic resin comprises chlorinated polyvinyl chloride.

6. A pressurized aerosol solvent cement product comprising:
   (a.) a container comprising a can, a valve cup with a valve assembly, a dip tube and an actuator, said can being comprised of tin-plated steel; and
   (b) an aerosol solvent cement composition disposed within said container, said aerosol solvent cement composition comprising:
      at least 10 weight percent tetrahydrofuran;
      at least 10 weight percent acetone;
      a thermoplastic resin;
      a propellant selected from the group consisting of ethers, C1–C4 saturated hydrocarbons, hydrofluorocarbons, and mixtures of the foregoing; and a stabilizing composition effective to keep the solvent weld composition stable after the aerosol solvent cement product has been held at a temperature of 120° F. for 90 days, said stabilizing composition comprising an oxazolidine compound.

7. The aerosol solvent cement product of claim 6, wherein the aerosol solvent cement composition further comprises a colorant.

8. The aerosol solvent cement product of claim 6, wherein the propellant comprises dimethyl ether.

9. The aerosol solvent cement product of claim 8, wherein the stabilizing composition further comprises an organotin compound, and a carbonate compound.

10. The aerosol solvent cement product of claim 9, wherein the oxazolidine compound comprises 3-n-butyl-2-(3-heptyl)oxazolidine.

11. The aerosol solvent cement product of claim 10, wherein the organotin compound comprises dibutyl tin dilaurate.

12. The aerosol solvent cement product of claim 11, wherein the carbonate compound comprises calcium carbonate.

13. The aerosol solvent cement product of claim 12, wherein the thermoplastic resin comprises chlorinated polyvinyl chloride.

14. The aerosol solvent cement product of claim 13, wherein the solvent system comprises:
   from 10 to about 50 weight weight percent tetrahydrofuran;
   from about 0.5 to about 25 weight percent methyl ethyl ketone;
   from about 5 to about 30 weight percent acetone; and
   from about 0.1 to about 5 weight percent of a dibasic ester.

* * * * *